United States Patent
Kuwamoto et al.

(10) Patent No.: US 9,070,292 B2
(45) Date of Patent: Jun. 30, 2015

(54) INFORMATION PROVIDING SYSTEM AND VEHICLE-MOUNTED APPARATUS

(75) Inventors: Tatsuya Kuwamoto, Kobe (JP); Takeshi Fukada, Kobe (JP); Kenji Uematsu, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 216 days.

(21) Appl. No.: 13/805,176

(22) PCT Filed: Jul. 12, 2011

(86) PCT No.: PCT/JP2011/065863
§ 371 (c)(1),
(2), (4) Date: Dec. 18, 2012

(87) PCT Pub. No.: WO2012/008437
PCT Pub. Date: Jan. 19, 2012

(65) Prior Publication Data
US 2013/0096921 A1  Apr. 18, 2013

(30) Foreign Application Priority Data

Jul. 13, 2010 (JP) .................................. 2010-159197

(51) Int. Cl.
| G10L 15/22 | (2006.01) |
|---|---|
| G08G 1/0962 | (2006.01) |
| H04M 1/60 | (2006.01) |
| G10L 13/00 | (2006.01) |

(52) U.S. Cl.
CPC .............. *G08G 1/0962* (2013.01); *G10L 15/22* (2013.01); *H04M 1/6083* (2013.01); *G10L 13/00* (2013.01)

(58) Field of Classification Search
CPC ... G01C 21/362; G01C 21/3608; G10L 15/22
USPC ................................. 704/275, 235; 455/569.2
See application file for complete search history.

(56) References Cited

U.S. PATENT DOCUMENTS

| 7,027,568 B1* | 4/2006 | Simpson et al. ............ 379/88.16 |
|---|---|---|
| 2007/0123191 A1* | 5/2007 | Simpson ......................... 455/345 |
| 2008/0007120 A1* | 1/2008 | Weyl et al. .................... 307/10.1 |
| 2010/0137037 A1* | 6/2010 | Basir ........................... 455/569.1 |
| 2011/0257973 A1* | 10/2011 | Chutorash et al. ............. 704/235 |
| 2012/0253823 A1* | 10/2012 | Schalk et al. ............... 704/270.1 |
| 2012/0259951 A1* | 10/2012 | Schalk et al. .................. 709/217 |

FOREIGN PATENT DOCUMENTS

| JP | A-10-290256 | 10/1998 |
|---|---|---|
| JP | A-2010-074215 | 4/2010 |

* cited by examiner

*Primary Examiner* — Daniel Abebe
(74) *Attorney, Agent, or Firm* — Oliff PLC

(57) ABSTRACT

A portable terminal apparatus is configured to obtain provided information including character data from an information distribution server apparatus, transmit partial data, which is a portion of the character data, to a voice synthesizing server apparatus, and obtain voice data obtained by converting the partial data into voice from the voice synthesizing server apparatus, and when a predetermined notification is received from a vehicle-mounted apparatus, a command is given to cause the vehicle-mounted apparatus to display the provided information corresponding to the voice data, and the vehicle-mounted apparatus displays information given by the portable terminal apparatus, plays the voice data, and when selection operation performed by a user is received, the portable terminal apparatus is notified that the selection operation has been performed.

5 Claims, 11 Drawing Sheets

| HEADLINE | MAIN TEXT | VOICE DATA | VOICE PLAYED | MAIN TEXT DISPLAYED | ... |
|---|---|---|---|---|---|
| AAAA | AAAAAAAAAA | 01.mp3 | ON | ON | |
| BBBB | BBBBBBBBBB | 02.mp3 | OFF | OFF | |
| ⋮ | ⋮ | ⋮ | ⋮ | ⋮ | |

FIG.8

| HEADLINE | MAIN TEXT | VOICE DATA | VOICE PLAYED | MAIN TEXT DISPLAYED | ... |
|---|---|---|---|---|---|
| AAAA | AAAAAAAAAA | 01.mp3 | OFF | ON | |
| BBBB | BBBBBBBBBB | 02.mp3 | OFF | OFF | |
| CCCC | CCCCCCCCCC | 03.mp3 | ON | ON | |
| DDDD | DDDDDDDDDD | 04.mp3 | OFF | OFF | |
| EEEE | EEEEEEEEEEE | 05.mp3 | OFF | OFF | |
| ⋮ | ⋮ | ⋮ | ⋮ | ⋮ | |

INFORMATION PROVIDING SYSTEM AND VEHICLE-MOUNTED APPARATUS

FIELD

This invention relates to a portable terminal apparatus for providing predetermined information to a vehicle-mounted apparatus, an information providing system having a vehicle-mounted apparatus, and a vehicle-mounted apparatus, and more particularly, to an information providing system and a vehicle-mounted apparatus capable of reducing the processing load imposed on a portable terminal without degrading safety of driving.

BACKGROUND

In the past, a portable terminal such as a cellular phone is known that obtains character information about a web page disclosed in a portal site, performs voice synthesizing processing of the obtained character information, and outputs the voice. For example, Patent Literature 1 discloses an information providing system and a portable terminal for receiving text content distributed from an information distribution server and converting the text content into voice data.

More specifically, the information providing system and the portable terminal of Patent Literature 1 allow a user to select whether to play voice or display text in accordance with the type of the contents received from an information distribution site. When the user selects to play voice, the portable terminal of the Patent Literature 1 downloads desired text content, converts the content into voice, and plays voice of the selected content.

The information providing system and portable terminal of Patent Literature 1 also allows a user to select whether to output voice of only the headline of the text content or to output voice of the main text of the text content.

Therefore, the portable terminal of Patent Literature 1 downloads any one of the headline or the main text selected by the user from the two options, converts the any one of the headline or the main text into voice, and plays the voice.

CITATION LIST

Patent Literature

Patent Literature 1: Japanese Patent Laid-Open No. 2007-323512

SUMMARY

Technical Problem

However, when the technique of Patent Literature 1 is used for a vehicle such as an automobile, the following problem occurs. A driver who is driving an automobile is prohibited from using a portable terminal while driving, and therefore, there is a problem in that the driver cannot perform the very selection operation itself.

Even if the technique of Patent Literature 1 is used for an automobile, this results in forcing the driver to perform multiple selection operations, and there is also a problem in that the safety of driving cannot be ensured.

Further, when the portable terminal performs the voice conversion as described in Patent Literature 1, there is a problem in that the manufacturing cost of the portable terminal increases, and in addition, the processing load is imposed on the portable terminal. This is because a large amount of resource is required to realize human-like natural voice conversion with a high processing speed when the text content is converted into voice.

Under the above circumstances, it is a great problem how to realize an information providing system and a vehicle-mounted apparatus capable of reducing the processing load imposed on the portable terminal without degrading the safety of driving.

This invention is made to solve the problems concerning the conventional technique as described above, and it is an object to provide an information providing system and a vehicle-mounted apparatus capable of reducing the processing load of the portable terminal without degrading the safety of driving.

Solution to Problem

To solve the problems as described above and to achieve an object, an information providing system comprising a portable terminal apparatus providing predetermined information to a vehicle-mounted apparatus and comprising the vehicle-mounted apparatus, in which the portable terminal apparatus includes: provided information obtaining means for obtaining provided information including character data from an information distribution server apparatus; voice data obtaining means for transmitting partial data, which is a portion of the character data, to a voice synthesizing server apparatus, and obtaining voice data obtained by converting the partial data into voice from the voice synthesizing server apparatus; and display command means, when receiving a predetermined notification from the vehicle-mounted apparatus, gives a command to cause the vehicle-mounted apparatus to display the provided information corresponding to the voice data, in which the vehicle-mounted apparatus includes: display means for displaying information given by the portable terminal apparatus; playback means for playing the voice data; and selection operation notification means, when receiving selection operation performed by a user, notifies the portable terminal apparatus that the selection operation has been performed.

A vehicle-mounted apparatus for playing information transmitted from a portable terminal apparatus, in which the vehicle-mounted apparatus includes: partial display means for displaying partial data which is a portion of character data transmitted from the portable terminal apparatus; playback means for playing voice data of the partial data transmitted from the portable terminal apparatus; selection operation notification means, when receiving selection operation performed by a user based on the partial data displayed by the partial display means, notifies the portable terminal apparatus that the selection operation has been received; and display means, when receiving a display command of the character data corresponding to the voice data from the portable terminal apparatus as the selection operation notification means notifies that the selection operation has been received, displays the character data.

Advantageous Effects of Invention

According to the present invention, an information providing system includes a portable terminal apparatus providing predetermined information to a vehicle-mounted apparatus and includes the vehicle-mounted apparatus, and the portable terminal apparatus is configured to obtain provided information including character data from an information distribution server apparatus, transmit partial data, which is a portion of the character data, to a voice synthesizing server apparatus, and obtain voice data obtained by converting the partial data into voice from the voice synthesizing server apparatus, and when a predetermined notification is received from a vehicle-mounted apparatus, a command is given to cause the vehicle-mounted apparatus to display the provided information corresponding to the voice data, and the vehicle-mounted apparatus displays information given by the portable terminal apparatus, plays the voice data, and when selection operation performed by a user is received, the portable terminal apparatus is notified that the selection operation has been performed, so that there is an advantage in that the processing load imposed on the portable terminal is suppressed without degrading safety of driving.

According to the present invention, the vehicle-mounted apparatus that plays information transmitted from the portable terminal apparatus displays partial data which is a portion of character data transmitted from the portable terminal apparatus, plays voice data of the partial data transmitted from the portable terminal apparatus, and when selection operation performed by a user based on the partial data displayed by the display means is received, the portable terminal apparatus is notified that the selection operation has been received, and when a display command of the character data corresponding to the voice data is received from the portable terminal apparatus as the notification indicating that the selection operation has been received is notified, the character data are displayed, so that there is an advantage in that the processing load imposed on the portable terminal is suppressed without degrading safety of driving.

BRIEF DESCRIPTION OF DRAWINGS

FIG. 8 is a figure illustrating an example of provided information.

DESCRIPTION OF EMBODIMENTS

Embodiment

A preferred embodiment of an information providing system and a vehicle-mounted apparatus according to the present invention will be hereinafter explained in detail with reference to appended drawings. In the explanation below, overview of the information providing system according to the present invention will be explained with reference to FIG. 1, and thereafter, an embodiment of an information providing system and a vehicle-mounted apparatus according to the present invention will be explained with reference to FIGS. 2 to 12. First, overview of the information providing system according to the present invention will be explained with reference to FIG. 1.

Figure 1:
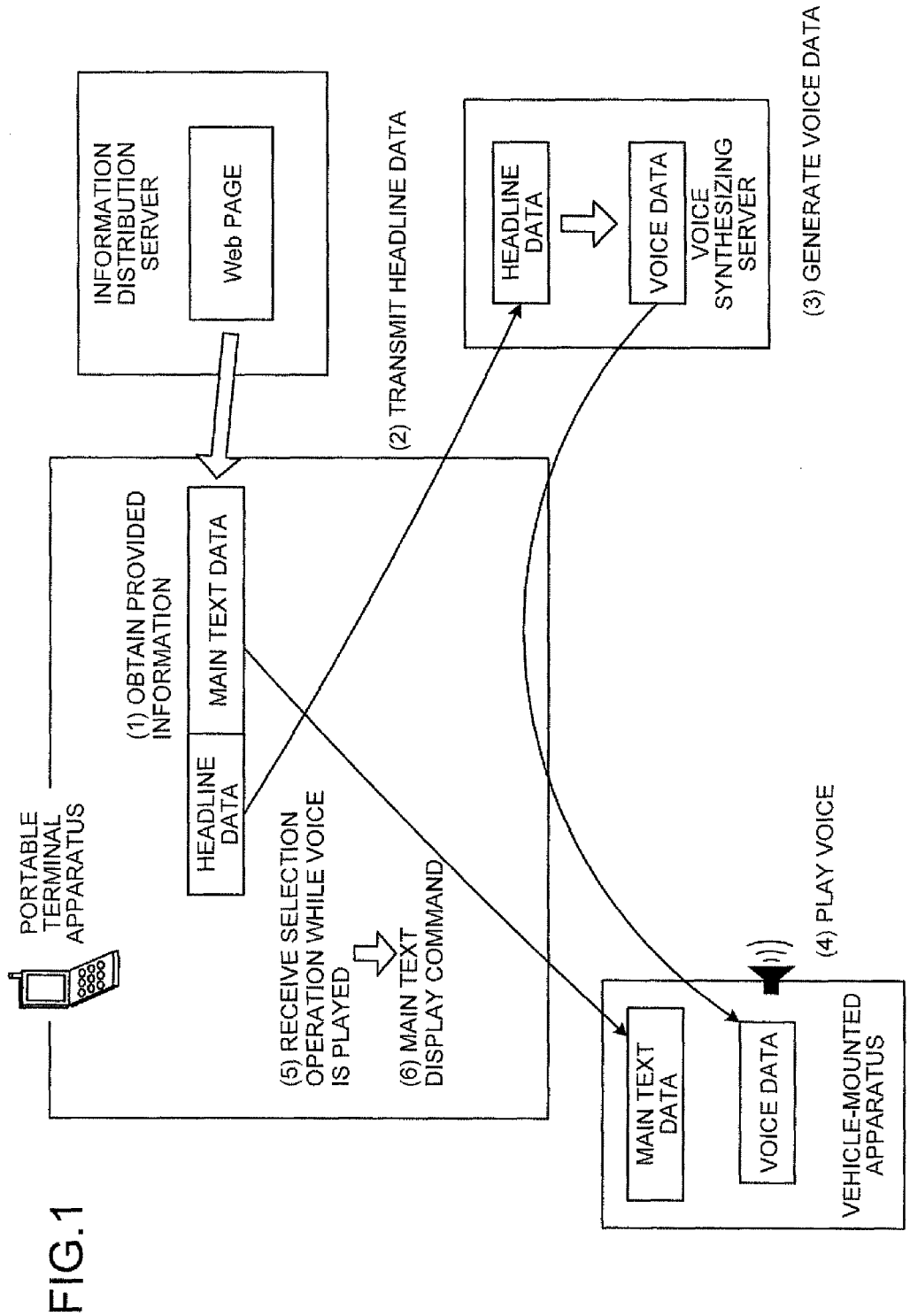
FIG. 1 is a figure illustrating overview of an information providing system according to the present embodiment.

FIG. 1 is a figure illustrating overview of the information providing system according to the present invention. When the information providing system according to the present invention converts only headlines of information of web pages including the headline and the main text obtained by a portable terminal apparatus into voice data, and receives selection operation while the converted voice data are played, the information providing system displays the main text corresponding to the selected headline.

As described above, in the information providing system according to the present invention, the menu selection is simplified using the voice data, and the information providing system according to the present invention is mainly characterized in being capable of making it less stressful for the driver to drive the vehicle while the driver drives the vehicle.

As shown in FIG. 1, a portable terminal and a vehicle-mounted apparatus such as a DA (Display Audio) mounted on an automobile cooperate with each other using a short distance wireless communication function, and the portable terminal is connected to an information distribution server publishing web pages a voice synthesizing server for converting for converting a character string into voice data.

In this case, the DA means a vehicle-mounted apparatus implements only basic function such as a display function, an audio playback function, a communication function with the portable terminal apparatus, and makes itself multifunctional by cooperating with the portable terminal apparatus.

It should be noted that the information distribution server publishes information such as the titles, addresses, headlines, main texts, summaries, and update dates of multiple web pages, as an RSS (Rich Site Summary) feed which is a file described in a standardized format.

Then, the user obtains the contents of such RSS feed by accessing the address stored in the RSS feed, i.e., a URL (Uniform Resource Locator), using the portable terminal apparatus.

First, the owner of the portable terminal apparatus (a driver in this case) registers the URL of the desired RSS feed to an application (hereinafter simply described as "appli") installed in the portable terminal apparatus in advance.

Then, when the driver brings the portable terminal apparatus possessed by the driver himself/herself into the vehicle, the appli for obtaining the RSS feed is activated, and provided information which is to be provided to the vehicle-mounted apparatus is obtained.

More specifically, the appli of the portable terminal apparatus accesses the URL registered in advance, thereby obtaining provided information, i.e., information obtained by extracting headline data and main text data from the RSS feed (see (1) of FIG. 1).

Then, the appli of the portable terminal apparatus transmits only the headline data to the voice synthesizing server (see (2) of FIG. 1), and the voice synthesizing server converts the character string of the headline data into voice, and generates voice data (see (3) of FIG. 1). Subsequently, the voice synthesizing server transmits the generated voice data to the portable terminal apparatus, and the appli of the portable terminal apparatus transmits the headline data as well as the voice data to the vehicle-mounted apparatus.

On the other hand, the vehicle-mounted apparatus displays a list of headline data received from the portable terminal apparatus on a display, and plays voice data with a speaker and the like provided in the vehicle of the driver, for each piece of headline data (see 4 of FIG. 1).

In this case, when predetermined selection operation is performed by the driver while the headline data are played as voice, and, for example, a predetermined button provided in the vehicle-mounted apparatus or a button displayed on a display of the vehicle-mounted apparatus is pressed down, the appli of the portable terminal apparatus receives such selection operation (see 5 of FIG. 1).

Then, when the appli of the portable terminal apparatus receives selection operation, the appli of the portable terminal apparatus deems that the headline data which is being played as voice are selected, and transmits a main text display command including main text data corresponding to the selected headline data to the vehicle-mounted apparatus (see 6 of FIG. 1). Accordingly, the vehicle-mounted apparatus displays the received main text data.

By the way, in order to ensure the safety of driving, there are rules concerning limitation of the number of characters that can be displayed on the display of the vehicle-mounted apparatus while driving, and limitation of the number of characters played as voice by the vehicle-mounted apparatus. For this reason, in the information providing system according to the present invention, when the vehicle of the driver is running, the information providing system according to the present invention withhold display of the above main text data, and after the vehicle of the driver is stopped, the information providing system according to the present invention displays the main text data on the display.

As described above, the information providing system according to the present invention uses the voice synthesizing server to convert only the headline data of web pages obtained by the portable terminal apparatus into voice data. When predetermined selection operation is performed while the voice data corresponding to the predetermined headline data are played, the portable terminal apparatus determines the main text data corresponding to the headline data as a display target.

More specifically, in the information providing system according to the present invention, only the headline data of the provided information made up with a combination of the headline data and the main text data are adopted as a target voice conversion. Further, the predetermined operation that is performed while the voice data are played is deemed as a display request of the main text data, so that menu selection is simplified.

Therefore, according to the information providing system according to the present invention, by reducing the load imposed on the driver while the driver drives the vehicle, the convenience can be improved while ensuring the safety of driving. In the information providing system according to the present invention, the voice synthesizing server is requested to perform the voice conversion, so that the processing load of the portable terminal can be suppressed.

Hereinafter, the embodiment of the information providing system according to the present invention explained with reference to FIG. 1 will be explained in detail. First, the configuration of the information providing system according to the present embodiment will be explained with reference to FIGS. 2 and 3.

Figure 2:
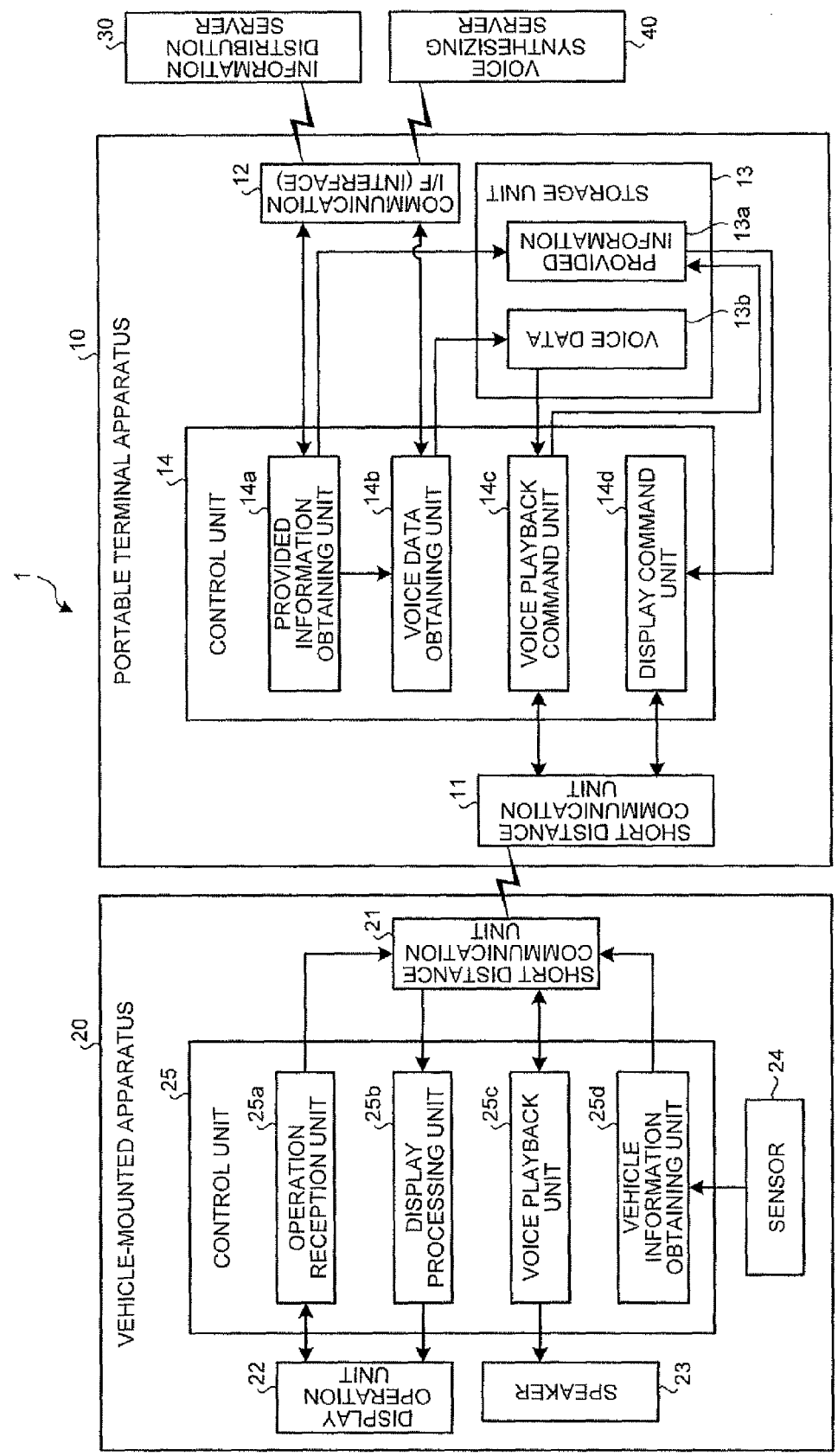
FIG. 2 is a first part of a block diagram illustrating a configuration of the information providing system according to the present embodiment.
Figure 3:
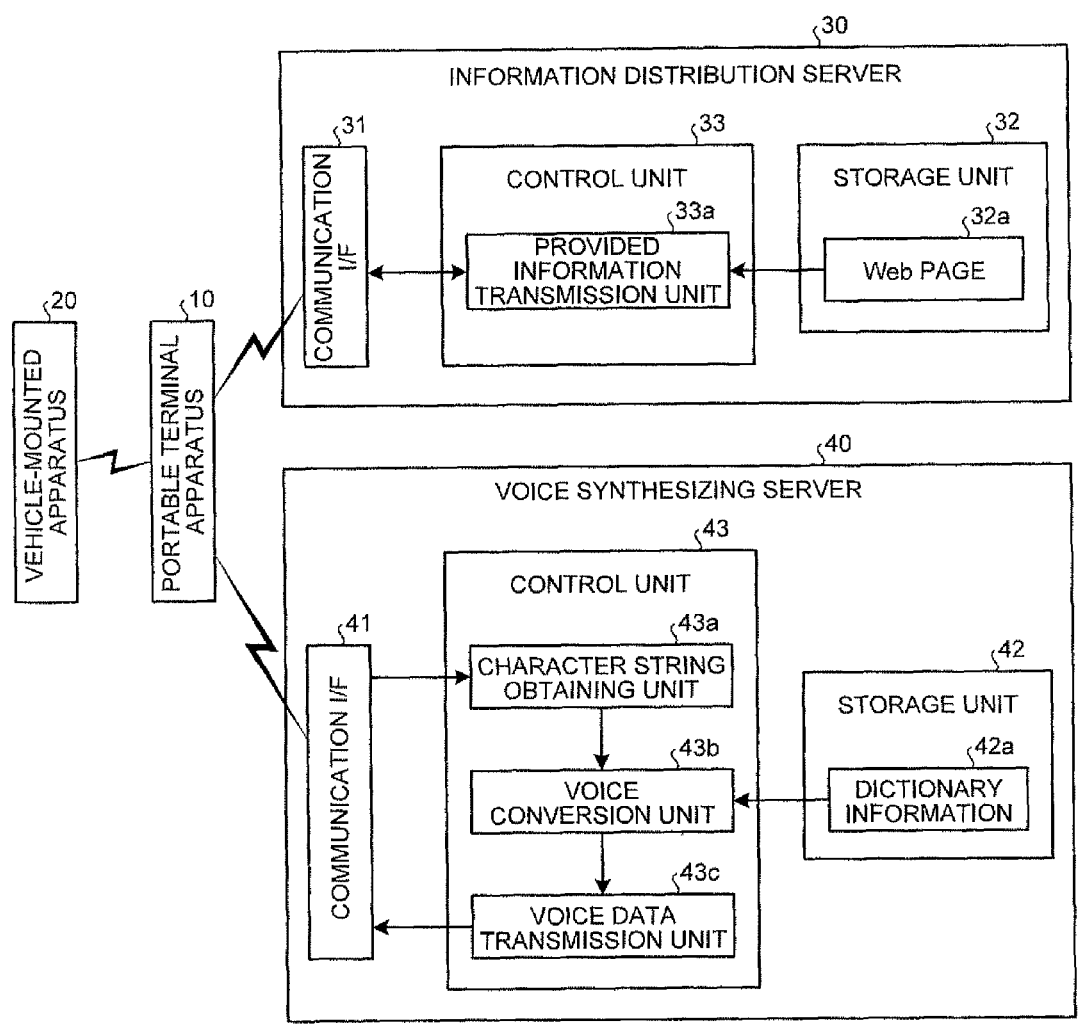
FIG. 3 is a second part of a block diagram illustrating the configuration of the information providing system according to the present embodiment.

FIG. 2 is a first part of a block diagram illustrating the configuration of the information providing system 1 according to the present embodiment. FIG. 3 is a second part of a block diagram illustrating the configuration of the information providing system 1 according to the present embodiment. FIGS. 2 and 3 only describe constituent elements required for explaining the features of the information providing system 1.

As shown in FIG. 2, the information providing system 1 includes a portable terminal apparatus 10, a vehicle-mounted apparatus 20, an information distribution server 30, and a voice synthesizing server 40. First, the configuration of the portable terminal apparatus 10 will be explained.

As shown in FIG. 2, the portable terminal apparatus 10 includes a short distance communication unit 11, a communication I/F (interface) 12, a storage unit 13, and a control unit 14. The control unit 14 further includes a provided information obtaining unit 14a, a voice data obtaining unit 14b, a voice playback command unit 14c, and a display command unit 14d, and the storage unit 13 stores provided information 13a and voice data 13b.

The short distance communication unit 11 uses short distance wireless communication such as Bluetooth (registered trademark) to establish each communication link with the vehicle-mounted apparatus 20 and uses each communication link thus established to perform communication processing between the portable terminal apparatus 10 and the vehicle-mounted apparatus 20.

In this case, the Bluetooth (registered trademark) is short distance wireless communication standard for wireless communication of a distance of a radius of about 10 m using a frequency band of 2.4 GHz, and in recent years, the Bluetooth (registered trademark) is widely applied to electronic devices such as a cellular phone and a personal computer.

In this case, communication performed between the portable terminal apparatus 10 and the vehicle-mounted apparatus 20 using Bluetooth (registered trademark) will be explained, but other wireless communication standards such as Wi-Fi (registered trademark) and ZigBee (registered trademark) may be used. Alternatively, communication between the portable terminal apparatus 10 and the vehicle-mounted apparatus 20 may be performed via wired communication.

The communication I/F 12 is connected to an antenna, not shown, for transmitting/receiving radio wave between the information distribution server 30 and the voice synthesizing server 40, and is constituted by a communication device for performing wireless communication. For example, the communication I/F 12 receives provided information included in the RSS feed of the information distribution server 30.

The storage unit 13 is a storage unit constituted by a storage device such as a nonvolatile memory and a hard disk drive. This storage unit 13 stores, as provided information 13a, the headline data and the main text data included in the RSS feed obtained from the information distribution server 30. The details of the provided information 13a will be explained later.

The storage unit 13 uses the voice data obtaining unit 14b to obtain the voice data converted into voice from the character string by the voice synthesizing server 40, and stores the voice data as voice data 13b. The control unit 14 is a control unit for controlling the entire portable terminal apparatus 10.

The provided information obtaining unit 14a obtains multiple pieces of headline data and main text data from the information distribution server 30 on the basis of a URL, not shown, registered in advance. The provided information obtaining unit 14a performs processing for storing the obtained headline data and main text data as the provided information 13a.

In this case, there are rules concerning limitation of the number of characters that can be displayed on the display of the vehicle-mounted apparatus 20 while driving, and limitation of the number of characters played as voice by the vehicle-mounted apparatus 20. Therefore, the provided information obtaining unit 14a adjusts the obtained headline data and main text data so as to abide by the rules, and stores the adjusted headline data and main text data to the provided information 13a.

The voice data obtaining unit 14b obtains the voice data generated from the character string of the headline data from voice synthesizing server 40, on the basis of the headline data obtained by the provided information obtaining unit 14a. The voice data obtaining unit 14b also performs processing for storing the obtained voice data to the voice data 13b of the storage unit 13.

When the read-aloud button provided in the vehicle-mounted apparatus 20 is pressed down and the voice playback command unit 14c receives voice playback operation, the voice playback command unit 14c transmits a voice playback command as well as the voice data 13b stored in the storage unit 13 to the vehicle-mounted apparatus 20 for each piece of headline data.

In this case, the voice playback command unit 14c also performs processing for registering, to the provided information 13a, information indicating that the transmitted voice data 13b are being played, and transmitting an emphasize display command for emphasizing and displaying the headline data corresponding to the voice data 13b to the vehicle-mounted apparatus 20.

Thereafter, when the voice playback command unit 14c receives a playback finish notification of the voice data 13b from the voice playback unit 25c of the vehicle-mounted apparatus 20, the voice playback command unit 14c transmits a voice playback command as well as the voice data 13b corresponding to subsequent headline data to the vehicle-mounted apparatus 20, and repeats the above processing for all the voice data 13b.

When the voice playback command unit 14c finishes transmission of all the voice data 13b as well as the voice playback command to the vehicle-mounted apparatus 20, the voice playback command unit 14c deletes the voice data 13b of the storage unit 13. The voice data 13b of the storage unit 13 may be deleted when the provided information obtaining unit 14a obtains another piece of provided information 13a. Accordingly, even when the driver fails to hear the voice, and plays the voice data 13b again, the vehicle-mounted apparatus 20 can handle such case.

The display command unit 14d transmits the headline data stored in the provided information 13a obtained by the provided information obtaining unit 14a as well as a list display command of headline data to the vehicle-mounted apparatus 20. When the display command unit 14d receives selection operation from the vehicle-mounted apparatus 20 while the voice data 13b are played, the display command unit 14d deems that the headline data corresponding to the voice data 13b are selected, and transmits the main text data corresponding to the selected headline data as well as the main text display command to the vehicle-mounted apparatus 20.

It should be noted that the display command unit 14d transmits, to the vehicle-mounted apparatus 20, the main text data included in the provided information 13a stored in the storage unit 13 by the provided information obtaining unit 14a in advance. However, when the selection operation is received from the vehicle-mounted apparatus 20, the main text data corresponding to the selected headline data may be obtained from the information distribution server 30, and the obtained main text data may be transmitted to the vehicle-mounted apparatus 20. Accordingly, the load imposed on the resource of the portable terminal apparatus 10 can be reduced.

In this case, when the display command unit 14d gives the main text display command, the display command unit 14d transmits, to the vehicle-mounted apparatus 20, the main text display command on the basis of the vehicle information from the vehicle information obtaining unit 25d. More specifically, when the vehicle having the vehicle-mounted apparatus 20 is at a stop, the display processing unit 25b transmits the main text display command to the vehicle-mounted apparatus 20. When the vehicle is running, the display processing unit 25b withholds the main text display command, and after the vehicle of the driver is stopped, the display processing unit 25b transmits the main text display command to the vehicle-mounted apparatus 20.

In this case, the display command unit 14d determines whether the vehicle having the vehicle-mounted apparatus 20 thereon is at a stop or running, and transmits the main text display command to the vehicle-mounted apparatus 20. However, the vehicle-mounted apparatus 20 may determine whether to display or withhold the main text data received from the display command unit 14d, on the basis of the vehicle information.

Subsequently, the configuration of the vehicle-mounted apparatus 20 will be explained. As shown in FIG. 2, the vehicle-mounted apparatus 20 includes a short distance communication unit 21, a display operation unit 22, a speaker 23, a sensor 24, and a control unit 25. Further, the control unit 25 includes an operation reception unit 25a, a display processing unit 25b, a voice playback unit 25c, and a vehicle information obtaining unit 25d.

The short distance communication unit 21 is the same as the short distance communication unit 11, and therefore, description thereabout is omitted. The display operation unit 22 includes a display unit for displaying headline data and main text data and an operation unit for receiving selection operation of headline data and voice playback operation.

For example, the display unit of the display operation unit 22 includes a display displaying headline data and main text data, and the operation unit is provided with a "read-aloud button" of voice data for performing voice playback operation and a "stop button" of voice playback for performing selection operation of headline data.

Constituent components for performing various kinds of operations and a display and provided in the display operation unit 22 should not be limited. Therefore, it may be possible to use a touch panel-type liquid crystal display which receives input with detection of pressure that is given with a finger, a pointing device, and the like, and also performs display and output Alternatively, using a display such as an HUD (Head-Up Display), the display may be made in a semitransparent manner in a windshield portion in front of the driver, or may be made in an instrument panel in front of the driver, or may be made in a rear-view mirror portion in front of the driver.

The speaker 23 is a voice output device for playing the voice data 13b and playing music data such as CD (Compact Disc). In this case, the speaker 23 is configured to be provided in the vehicle-mounted apparatus 20, but the speaker 23 may be separately provided.

The sensor 24 is a measurement device for detecting various kinds of information about the vehicle such as the running speed of the vehicle of the driver, the travelled distance, the rotational speed of the engine, and voltage (hereinafter referred to as "vehicle information"). The sensor 24 is configured to be provided in the vehicle-mounted apparatus 20. Alternatively, it may be provided separately.

The control unit 25 is a control unit for controlling the entire vehicle-mounted apparatus 20. The operation reception unit 25a is a processing unit for receiving various kinds of operations from the display operation unit 22, and performing processing for giving them to the portable terminal apparatus 10.

More specifically, when the driver and passengers press "read-aloud button" of voice data, the operation reception unit 25a transmits, to the portable terminal apparatus 10, a message indicating that the voice playback operation is received. When the "stop button" of playback of voice is pressed down while the voice is played, the operation reception unit 25a transmits, to the portable terminal apparatus 10, a message indicating that the headline data corresponding to the voice data 13b which is being played is selected.

The display processing unit 25b is a processing unit for, when the display processing unit 25b receives headline data and a list display command of headline data from the display command unit 14d, performing processing of displaying a list of the received headline data on the display operation unit 22. When all the headline data cannot be displayed on the screen of the display of the display operation unit 22, the list may be scrolled, or the list may be displayed according to a display method transitioning to multiple screens.

When the display processing unit 25b receives, from the display command unit 14d, an emphasis display command for emphasizing and displaying headline data corresponding to the voice data 13b received from the voice playback command unit 14c, the display processing unit 25b also performs emphasize display processing of the corresponding headline data. For example, the emphasis display method may be blinking the headline data, or may display the representing color of the headline data in a display color different from the other headline data. Alternatively, the headline data may be displayed in the same manner as the state in which the cursor is focused on the headline data.

Further, when the display processing unit 25b receives, from the display command unit 14d, the main text data corresponding to the headline data selected by the driver as well as a main text display command, the display processing unit 25b also performs processing of displaying the received main text data on the display.

When the voice playback unit 25c receives the voice data 13b as well as the voice playback command from the voice playback command unit 14c, the voice playback unit 25c plays the received voice data 13b using the speaker 23. When the playback is finished, the voice playback unit 25c also performs processing of transmitting a playback finish notification to the voice playback command unit 14c.

When the voice playback unit 25c finishes playback of the voice data 13b corresponding to a piece of headline data, the driver may be notified by means of a message as to whether selection is made or not or sound of a bell. Alternatively, until the voice data 13b corresponding to subsequent headline data are played, the playback may be withheld for a predetermined period of time, or may be withheld for a predetermined period of time as well as notification with sound of a bell and the like. Accordingly, this can prevent the driver from losing a chance of selecting desired headline data.

The vehicle information obtaining unit 25d obtains vehicle information detected by the sensor 24, and transmits the vehicle information to the portable terminal apparatus 10. In this case, the vehicle information is the running speed of the vehicle of the driver, and the portable terminal apparatus 10 determines, based on the running speed, whether the vehicle having the vehicle-mounted apparatus 20 is at a stop or running. The vehicle information obtaining unit 25d may transmit, as the vehicle information, information indicating whether the vehicle of the driver is at a stop or running, instead of the running speed.

Subsequently, the configuration of the information distribution server 30 and the voice synthesizing server 40 will be explained with reference to FIG. 3. As shown in FIG. 3, the information distribution server 30 includes a communication I/F 31, a storage unit 32, and a control unit 33. The control unit 33 further includes a provided information transmission unit 33a, and the storage unit 32 stores a web page 32a.

The communication I/F 31 is constituted by a communication device for transmitting and receiving data with the portable terminal apparatus 10. For example, the communication I/F 31 receives a provided information transmission command as well as a URL from the portable terminal apparatus 10.

The storage unit 32 is a storage unit constituted by a storage device such as a nonvolatile memory and a hard disk drive. This storage unit 32 stores, as the web page 32a, a document disclosed in the Internet such as a source of a homepage and an RSS feed.

The control unit 33 is a control unit for controlling the entire information distribution server 30. When the provided information transmission unit 33a receives a URL from the portable terminal apparatus 10, the provided information transmission unit 33a transmits information about the web page 32a stored at the URL to the portable terminal apparatus 10.

More specifically, the URL received from the portable terminal apparatus 10 specifies the address of the RSS feed, and the provided information transmission unit 33a extracts the headline data and the main text data from the RSS feed stored at the specified URL, and transmits the headline data and the main text data to the portable terminal apparatus 10.

Subsequently, the configuration of the voice synthesizing server 40 will be explained. As shown in FIG. 3, the voice synthesizing server 40 includes a communication I/F 41, a storage unit 42, and a control unit 43. The control unit 43 further includes a character string obtaining unit 43a, a voice conversion unit 43b, and a voice data transmission unit 43c, and the storage unit 42 stores dictionary information 42a.

The communication I/F 41 is constituted by a communication device for transmitting and receiving data with the portable terminal apparatus 10. For example, the communication I/F 41 receives headline data as well as a voice data conversion command from the portable terminal apparatus 10.

The storage unit 42 is a storage unit constituted by a storage device such as a nonvolatile memory and a hard disk drive. This storage unit 42 stores the dictionary information 42a used for converting the character string into voice data.

The control unit 43 is a control unit for controlling the entire voice synthesizing server 40. The character string obtaining unit 43a is a processing unit for, when the character string obtaining unit 43a receives the headline data as well as the voice data conversion command from the portable terminal apparatus 10, performing processing of giving the character string of the headline data to the voice conversion unit 43b.

The voice conversion unit 43b is a processing unit for converting the character string of the headline data received from the character string obtaining unit 43a into voice on the basis of the dictionary information 42a to generate voice data, and giving the voice data to the voice data transmission unit 43c. The dictionary information 42a is not necessary, and the headline data may be converted into voice without using the dictionary information 42a.

The voice data transmission unit 43c is a processing unit for performing processing of transmitting the voice data received from the voice conversion unit 43b to the voice data obtaining unit 14b of the portable terminal apparatus 10.

Figures 4, 5:
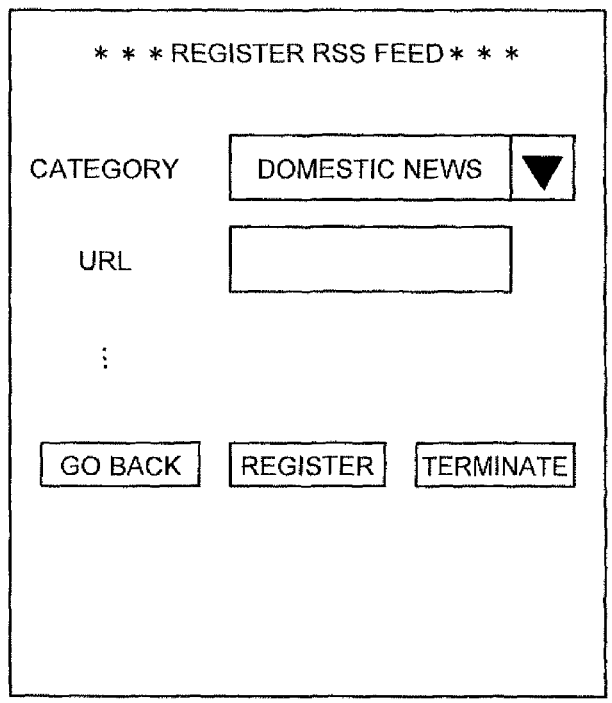
FIG. 4 is a figure illustrating an example of provided information.
FIG. 5 is a figure illustrating an example of an RSS feed registration screen.

Subsequently, the details of the provided information 13a stored in the storage unit 13 of the portable terminal apparatus 10 will be explained with reference to FIG. 4. FIG. 4 is a figure illustrating an example of the provided information 13a.

As shown in FIG. 4, the provided information 13a includes a "headline" item, a "main text" item, a "voice data" item, a "playing-back" item, and a "main text display" item. The provided information 13a is an aggregation of records where information constituted by such items is made into one record. The "headline" item and the "main text" item are headline data and main text data received by the provided information obtaining unit 14a.

The "voice data" item is a filename of the voice data 13b for each piece of the headline data obtained by the voice data obtaining unit 14b. It should be noted that the "voice data" item may not be a filename. For example, it may be an address of the storage unit 13 in which the voice data 13b are stored.

A file of voice data in an mp3 (MPEG Audio Layer-3) format as shown in FIG. 4 is in a compressed voice file format for digital voice. However, voice data of another file format may be used, so that it is the minimum compression format in accordance with the performance of the vehicle-mounted apparatus 20 playing the voice data 13b.

The "playing-back" item is a flag indicating whether the voice data 13b corresponding to the headline data are being played or not. For example, when the voice data 13b of which filename of the voice data is "01.mp3" is transmitted to the voice playback unit 25c, such voice data 13b are determined to be played, and the "playing-back" item is set to "ON" state (see the first line of FIG. 4). Thereafter, when the playback finish notification is received from the voice playback unit 25c, the "playing-back" item is set to "OFF" state.

The "main text display" item is a flag indicating which piece of the main text data is selected. For example, the following case will be explained: selection operation is received from the vehicle-mounted apparatus 20 while the voice data 13b of which filename of voice data is "01.mp3" are played. In this case, the headline data corresponding to the voice data 13b "01.mp3" is selected, and the "main text display" item is set to "ON" state (see the first line of FIG. 4).

Figure 6:
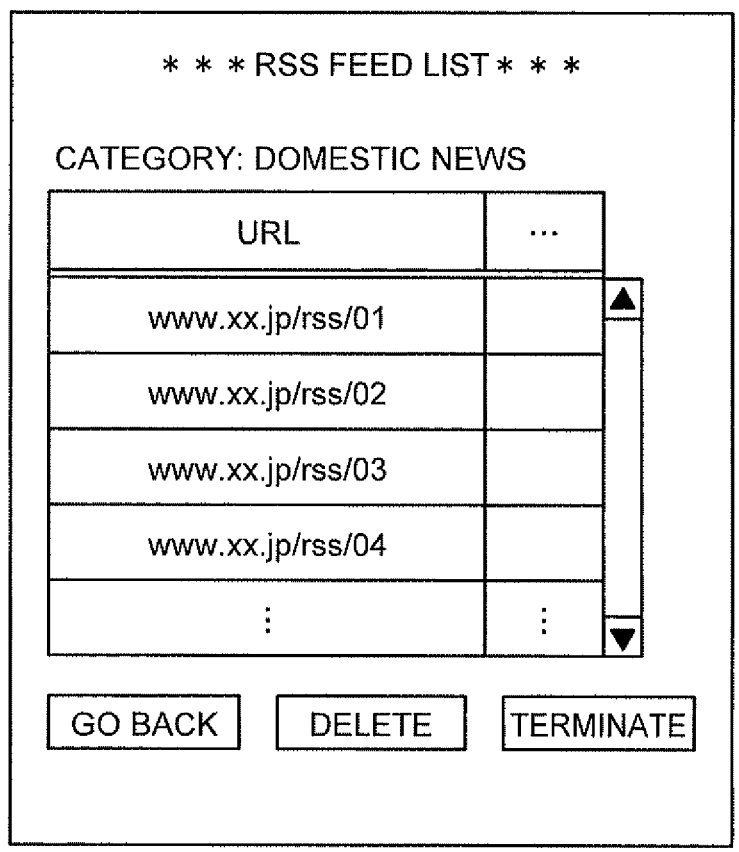
FIG. 6 is a figure illustrating an example of an RSS feed list display screen.

Subsequently, processing for registering a URL of an RSS feed desired by the driver to the appli provided in the portable terminal apparatus 10 in advance will be explained with reference to FIGS. 5 and 6. FIG. 5 is a figure illustrating an example of an RSS feed registration screen. FIG. 6 is a figure illustrating an example of an RSS feed list display screen.

When the URL of the RSS feed is registered, the driver activates the appli provided in the portable terminal apparatus 10, and when the driver selects an "RSS feed registration" using a menu and the like, not shown, a registration screen as shown in FIG. 5 is displayed on the display of the portable terminal apparatus 10.

Then, when the driver inputs a "category", inputs the "URL" of the RSS feed, and presses down the "registration" button, the URL of the RSS feed that has been input is registered to the appli for each category.

The category may be selected from a selection list which is classified in advance by the appli, by pressing down a triangular button provided at the right of the input field of "category". Alternatively, the URL may be registered without specifying any category.

Alternatively, the portable terminal apparatus 10 may directly access the URL at which the contents of the desired RSS feed is displayed, and the contents are displayed with a browser, and the displayed URL may be registered to the appli by selecting an "RSS feed registration" in a "sub-menu", not shown.

As described above, as shown in FIG. 6, on the screen displayed as a list for each category, the driver can confirm the URL of the RSS feed registered. With the appli, the driver selects some of the list, and presses down "delete" button, thus deleting the selected URL.

Figure 7A:
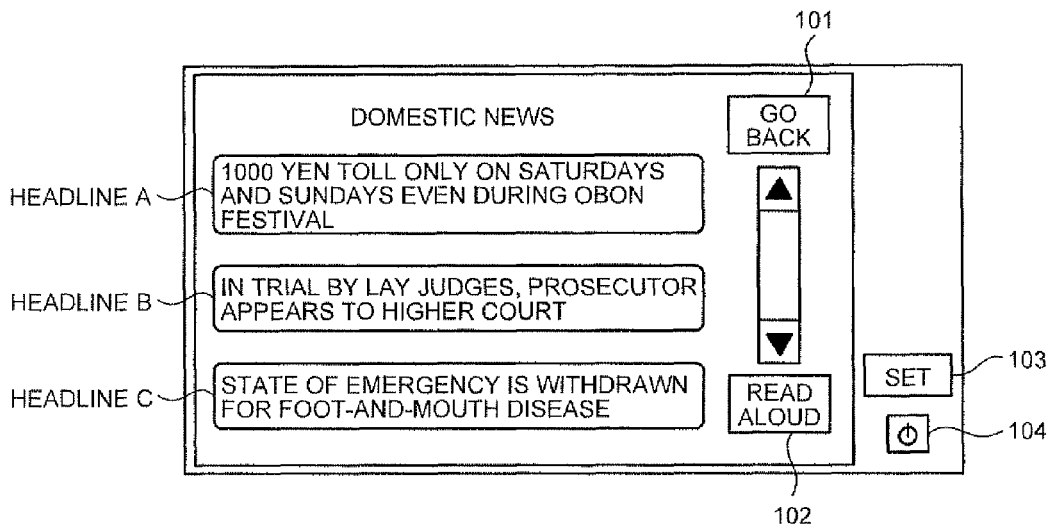
FIG. 7A is a first part of a figure illustrating an example of a headline data display screen.
Figure 7B:
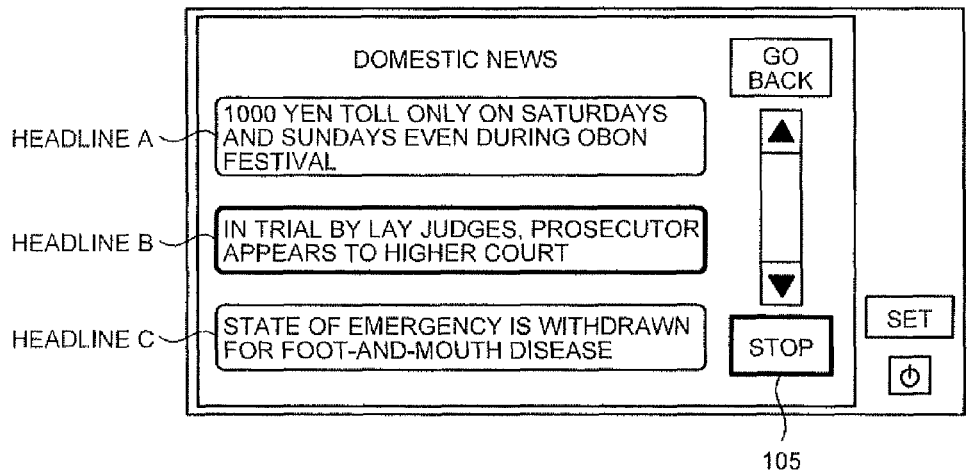
FIG. 7B is a second part of a figure illustrating an example of a headline data display screen.

Subsequently, the display screen of the headline data displayed on the display of the vehicle-mounted apparatus 20 will be explained with reference to FIGS. 7A and 7B. FIG. 7A is a first part of a figure illustrating an example of the headline data display screen. FIG. 7B is a second part of a figure illustrating an example of the headline data display screen. In this case, the display of the vehicle-mounted apparatus 20 is a touch panel-type liquid crystal display.

As shown in FIG. 7A, a list of headline data is displayed on the display of the vehicle-mounted apparatus 20, and on the screen, headlines A, B, C are displayed, and the driver can see the other headlines by scrolling the list.

A "go back" button 101 and a "read-aloud" button 102 that can be operated and commanded by touch operation are displayed on the display. When the "go back" button 101 is touched, the vehicle-mounted apparatus 20 displays a previous screen. For example, the previous screen may be a screen for selecting a category of headline data.

The "read-aloud" button 102 is a button for receiving voice playback operation, and when the "read-aloud" button 102 is touched, the vehicle-mounted apparatus 20 plays the voice of the headline data displayed on the display.

In this case, when the voice is played, as shown in FIG. 7B, the "read-aloud" button 102 is changed to the "stop" button 105 to become the button for receiving the selection operation. The headline data of which voice data 13b are played are emphasized and displayed. FIG. 7B shows a case where the voice data 13b of the headline B is played.

The "stop" button 105 is a button for receiving selection operation, and when the "stop" button 105 is touched, the vehicle-mounted apparatus 20 stops playing the voice, and when the vehicle of the driver is at a stop, the main text data corresponding to the voice data 13b being played are displayed.

The information providing system 1 receives voice playback operation and selection operation when various kinds of operation buttons are pressed down. However, in recent years, a portable terminal having a voice recognition engine is widely available.

Accordingly, the information providing system 1 may be constituted by a portable terminal apparatus 10 having a voice recognition engine. Voice can be input into the portable terminal apparatus 10 or the vehicle-mounted apparatus 20 using a hands-free unit such as a headset microphone.

Then, the input voice is analyzed by a voice recognition engine provided in the portable terminal apparatus 10, and is retrieved as character data, and predetermined character data may be allocated as voice playback operation and selection operation.

For example, when voice "read aloud" is input, the portable terminal apparatus 10 deems that the voice playback operation is received, and when voice "main text" is input, the portable terminal apparatus 10 deems that the selection operation is received and performs processing corresponding to each operation. Accordingly, the driver need not perform manual operation to the vehicle-mounted apparatus 20, and the information providing system 1 can ensure safety of driving.

Further, an operation button displayed on the display has been hereinabove explained. The display of the vehicle-mounted apparatus 20 such as a DA (Display Audio) provided on an automobile is provided with not only an operation unit for touch operation to the display but also an operation button at a screen frame portion and the like.

In this case, as shown in FIG. 7A, the display of the vehicle-mounted apparatus 20 is provided with a SET button 103 and a power supply button 104. Predetermined function may be given to these operation buttons.

For example, the following case will be explained with reference to FIG. 8: the SET button 103 is given a function of receiving selection operation where not only headline data played by the voice data 13b but also main text data corresponding to multiple pieces of headline data are displayed on the display of the vehicle-mounted apparatus 20.

FIG. 8 is a figure illustrating an example of provided information 13a. When the SET button 103 is pressed down when the voice is played, the vehicle-mounted apparatus 20 transmits, to the display command unit 14d, a message indicating that multiple selection operations are received, and continues playing the voice.

On the other hand, when multiple selection operations are received from the vehicle-mounted apparatus 20 while the voice data 13b are played, the display command unit 14d deems that the headline data corresponding to the voice data 13b are selected, and sets the "main text display" item of the provided information 13a to "ON" state. Then, when the SET button 103 is pressed down while the voice is played, the above processing is repeated.

Thereafter, when all the voice data 13b have been played, or when an operation button, not shown, is pressed down and a main text display operation is received, the vehicle-mounted apparatus 20 displays, on the display, all the main text data of which "main text display" items of the provided information 13a are "ON" state. As described above, the driver can add interesting headline data to a bookmark with simple operation, and when the vehicle of the driver is stopped, the driver can view the main text data that have been added to the bookmark.

FIG. 8 shows the provided information 13a where multiple selection operations are received from the vehicle-mounted apparatus 20 while the voice data 13b of which filenames of voice data are "01.mp3" and "03.mp3" are played (see the first, third lines of FIG. 8). In a case of such provided information 13a, the vehicle-mounted apparatus 20 displays, on the display, the main text data corresponding to the voice data of which filenames are "01.mp3" and "03.mp3".

Figure 9:
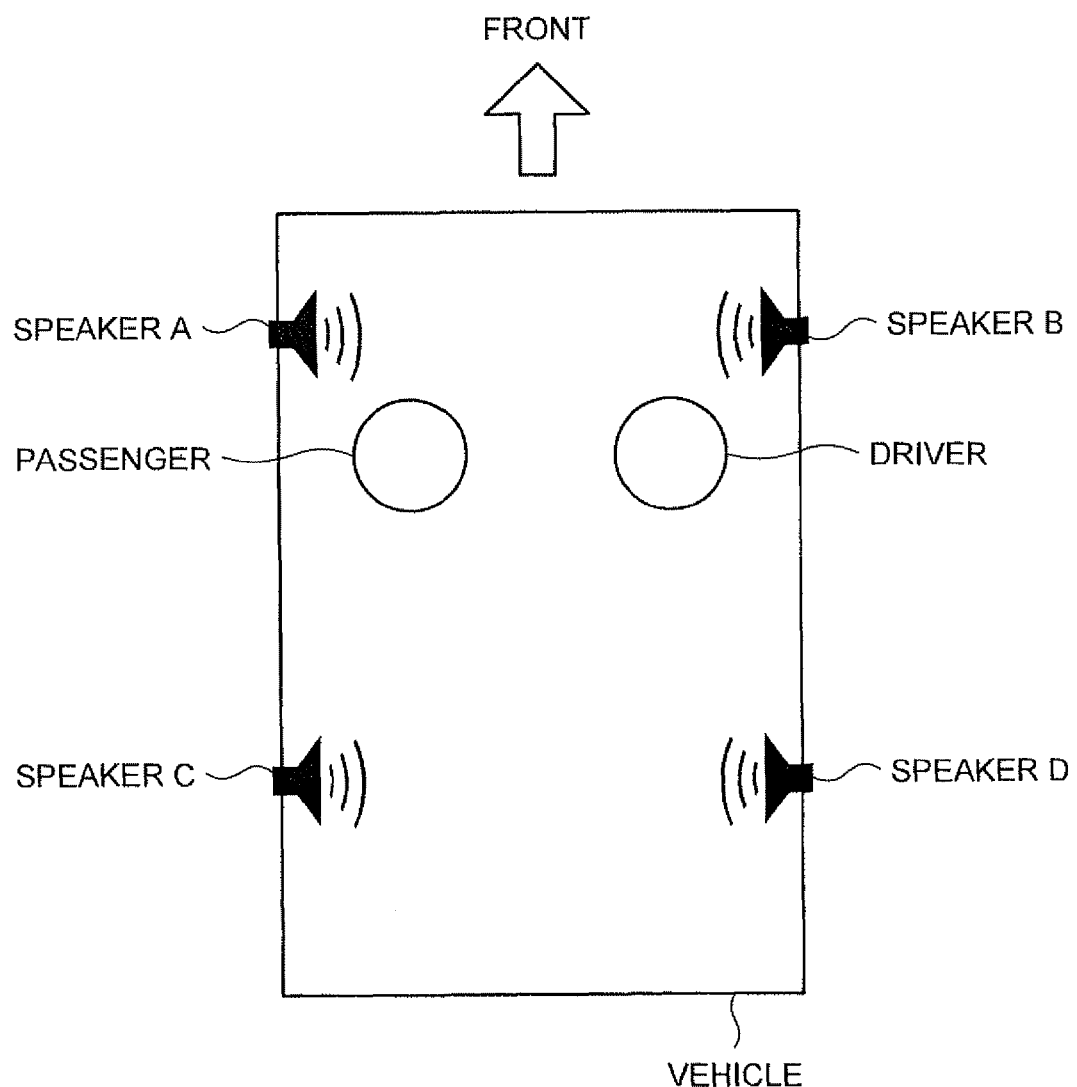
FIG. 9 is a figure explaining an AV (Audio Visual) profile.

Subsequently, the AV (Audio Visual) profile employed by the vehicle-mounted apparatus 20 will be explained with reference to FIG. 9. FIG. 9 is a figure illustrating the AV (Audio Visual) profile.

In this case, the AV (Audio Visual) profile is an audio/video-related standardized technical specification in which procedures and used protocols and the like for distributing audio/video data are defined.

The information providing system 1 uses A2DP (Advanced Audio Distribution Profile) when music data played by the portable terminal apparatus 10 by means of short distance wireless communication of Bluetooth (registered trademark) are output as voice to the speaker 23 provided in the vehicle-mounted apparatus 20. It should be noted that A2DP is one of AV profiles of Bluetooth (registered trademark).

In the information providing system 1, when the voice data 13b obtained by converting the headline data are played, the information providing system 1 uses an AV profile for serially connecting devices which is called SPP (Serial Port Profile). It should be noted that the used AV profile is not limited thereto, and this may be embodied using other configurations.

As described above, the information providing system 1 uses two different AV profiles, i.e., A2DP and SPP, thus capable of playing the voices without any interference between both of the voices. When the voice data 13b are played while the music data are played with A2DP, the voice may be played upon changing the output level of the predetermined speaker 23 for each AV profile.

More specifically, as shown in FIG. 9, a case where speakers 23 are installed at the right and left and in the front and the back of the vehicle will be explained. First, suppose that the music data are played with the four speakers 23 installed in the vehicle.

Accordingly, when the voice playback command unit 14c receives voice playback operation, the voice playback command unit 14c transmits the voice playback command of the voice data 13b to the vehicle-mounted apparatus 20. On the other hand, when the vehicle-mounted apparatus 20 receives the voice playback command and plays the voice of the voice data 13b, the vehicle-mounted apparatus 20 reduces the output level of the predetermined speaker 23 with A2DP.

For example, the vehicle-mounted apparatus 20 increases the output level of the speaker B which is the speaker 23 in proximity to the driver only for the voice data 13b, and mutes (eliminates the voice) for the music data.

The output levels of the speakers A, C, D which are the other speakers 23 are increased only for the music data, and are muted for the voice data 13b. By doing so, the voice data 13b is heard only by the driver without cutting the music data that are heard by a passenger on the vehicle besides the driver.

Figure 10:
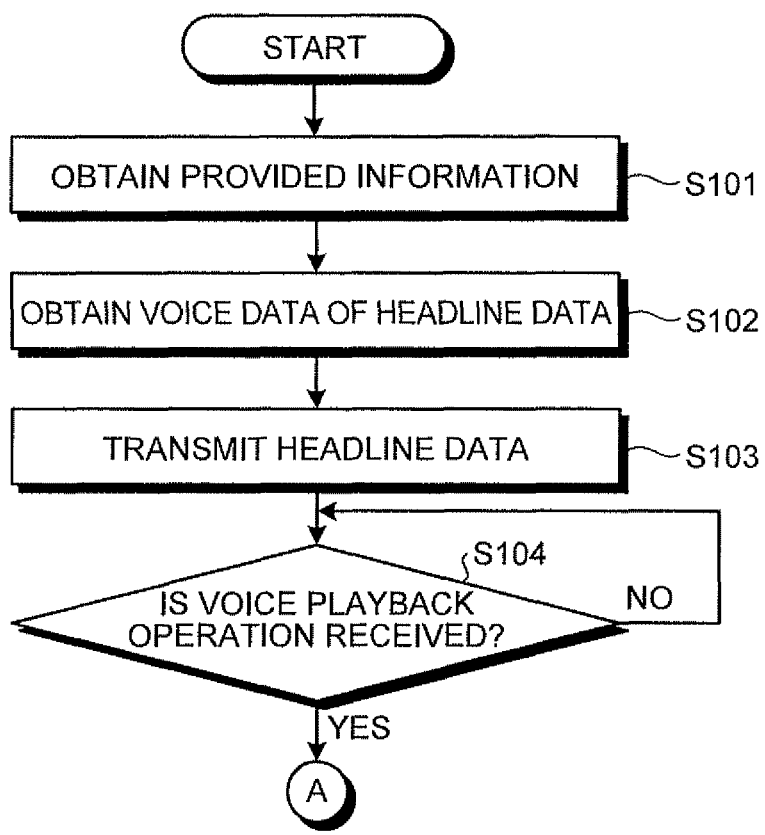
FIG. 10 is a first part of a flowchart illustrating overview of processing procedure executed by the information providing system.
Figure 11:
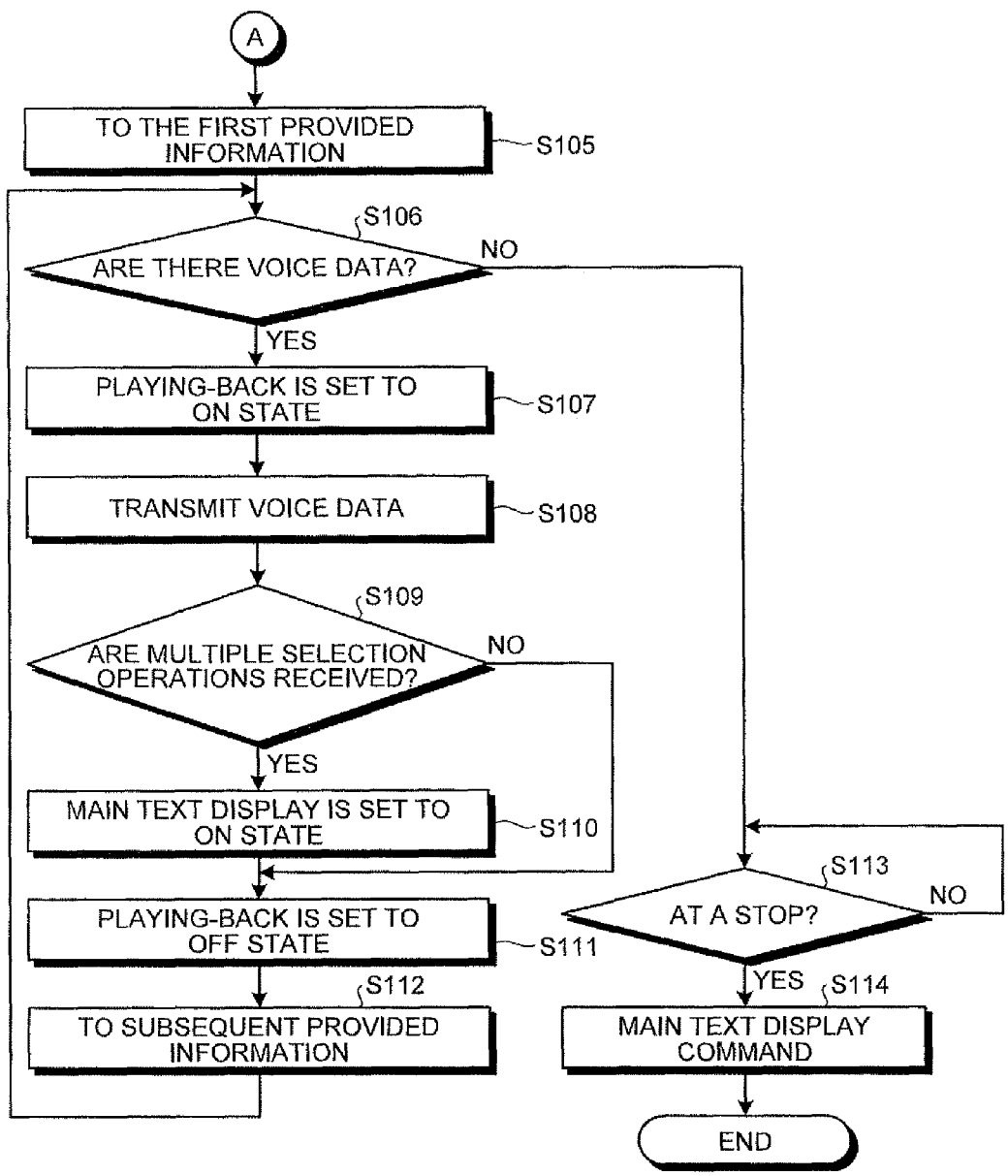
FIG. 11 is a second part of a flowchart illustrating overview of processing procedure executed by the information providing system.

Subsequently, the details of information providing processing procedure executed by the portable terminal apparatus 10 according to the present embodiment will be explained with reference to FIGS. 10 to 11. FIG. 10 is a first part of a flowchart illustrating overview of processing procedure executed by the information providing system. FIG. 11 is a second part of a flowchart illustrating overview of processing procedure executed by the information providing system. In this case, a case where multiple selection operations are received from the vehicle-mounted apparatus 20 will be explained.

As shown in FIG. 10, the provided information obtaining unit 14a obtains the provided information 13a from the information distribution server 30 via the communication I/F 12 (step S101), and the voice data obtaining unit 14b obtains the voice data 13b of the headline data from the voice synthesizing server 40 (step S102).

Then, the display command unit 14d transmits the headline data stored in the provided information 13a obtained by the provided information obtaining unit 14a as well as a list display command of headline data to the vehicle-mounted apparatus 20 (step S103).

Then, the voice playback command unit 14c determines whether the read-aloud button provided in the vehicle-mounted apparatus 20 is pressed down and the voice playback operation is received (step S104), and when the voice playback operation is determined not to be received (step S104, No), the determination processing of step S104 is repeated.

On the other hand, when the voice playback command unit 14c determines that the voice playback operation is received (step S104, Yes), the voice playback command unit 14c moves to the provided information 13a of the first record (step S105), and performs the following processing.

The voice playback command unit 14c determines whether the voice data 13b corresponding to the provided information 13a of the record exist or not (step S106), and when the voice data 13b exist (step S106, Yes), the "playing-back" item of the provided information 13a is set to "ON" state (step S107).

Then, the voice playback command unit 14c transmits the voice data 13b as well as the voice playback command to the vehicle-mounted apparatus 20 (step S108).

Thereafter, the display command unit 14d determines whether multiple selection operations are received from the vehicle-mounted apparatus 20 while the voice data 13b are played (step S109).

When multiple selection operations are received from the vehicle-mounted apparatus 20 while the voice data 13b are played (step S109, Yes), the display command unit 14d sets the "main text display" item of the provided information 13a to "ON" state (step S110).

On the other hand, when multiple selection operations are not received from the vehicle-mounted apparatus 20 while the voice data 13b are played (step S109, No), the display command unit 14d proceeds to processing in step S111.

Thereafter, when the playback finish notification of the voice data 13b is received from the voice playback unit 25c, the voice playback command unit 14c deems that the playback is finished, and sets the "playing-back" item of the provided information 13a to "OFF" state (step S111).

Then, the voice playback command unit 14c moves on to the provided information 13a of a subsequent record (step S112), and the voice playback command unit 14c proceeds to processing in step S106, and repeats the processing in steps S106 to S112 for the provided information 13a of all the records.

On the other hand, when, in step S106, the voice data 13b do not exist (step S106, No), the voice playback command unit 14c deems that the processing is finished for the provided information 13a of all the records, and proceeds to processing in step S113.

In step S113, the display command unit 14d determines whether the vehicle is at a stop or running, on the basis of the vehicle information received from the vehicle information obtaining unit 25d (step S113), and when the vehicle is running (step S113, No), the determination processing of step S113 is repeated until the vehicle stops.

When the vehicle stops (step S113, Yes), the display command unit 14d deems that the headline data of which "main text display" item of the provided information 13a is set to "ON" state are selected, and transmits the main text data corresponding to the headline data selected as well as the main text display command to the vehicle-mounted apparatus 20 (step S114), and then, the series of the information providing processing executed by the portable terminal apparatus 10 is terminated.

As described above, the information providing system 1 according to the present invention uses the voice synthesizing server 40 to convert only the headlines of information about web pages including the headlines and main texts obtained by the portable terminal apparatus 10 into the voice data 13b, and when selection operation is received while the converted voice data 13b are played by the vehicle-mounted apparatus 20, the main text corresponding to the selected headline is displayed on the display of the vehicle-mounted apparatus 20, so that the information providing system 1 according to the present invention can simplify the menu selection with the voice data, and can reduce the processing load imposed on the portable terminal without degrading the safety of driving.

In the above embodiment, the headline data and the main text data included in the RSS feed of the web page 32a obtained from the information distribution server 30 is adopted as the provided information 13a. However, the combination of the headline data and the main text data need not be limited as described above. In addition to the above configuration, the information providing system 1 may be implemented in various different configurations.

Figure 12:
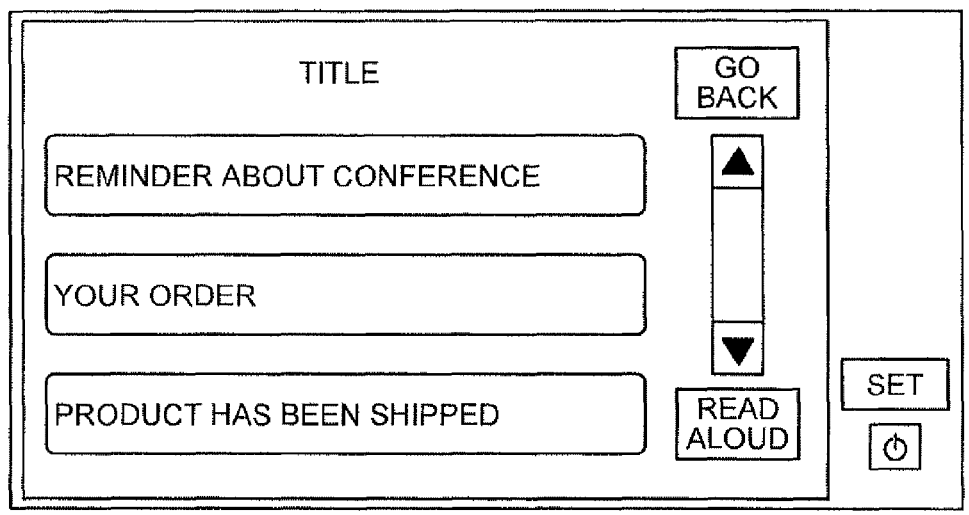
FIG. 12 is a figure illustrating an example of a headline data display screen.

In the explanation below, a case where the target of the original data of the provided information 13a is configured as an e-mail transmitted and received by a mail server transmitting and receiving an e-mail will be explained with reference to FIG. 12. FIG. 12 is a figure illustrating an example of a headline data display screen.

In this case, the provided information obtaining unit 14a of the portable terminal apparatus 10 obtains an e-mail sent from the mail server to the portable terminal apparatus 10, and stores the title and the main text as the provided information 13a. The voice data obtaining unit 14b converts only the title of the obtained e-mail into the voice data 13b, which is played by the vehicle-mounted apparatus 20 as voice.

In this case, as shown in FIG. 12, a title list is displayed on the display of the vehicle-mounted apparatus 20. The voice playback operation and the selection operation are the same as the above method, and accordingly, description thereabout is omitted.

Therefore, even when the driver is driving the car, the driver can confirm, by means of voice, the titles of the e-mails received by the portable terminal apparatus 10 of the driver, and the driver can see the main body of any desired e-mail while the car is at a stop with a simple operation.

INDUSTRIAL APPLICABILITY

As described above, the information providing system and the vehicle-mounted apparatus according to the present invention are useful when the vehicle-mounted apparatus is used to make selection operation, and in particular, the information providing system and the vehicle-mounted apparatus according to the present invention are suitable for a case where it is desired to suppress the processing load imposed on the portable terminal without degrading the safety of driving.

REFERENCE SIGNS LIST 1 information providing system
10 portable terminal apparatus
11 short distance communication unit
12 communication I/F
13 storage unit
14 control unit
14a provided information obtaining unit
14b voice data obtaining unit
14c voice playback command unit
14d display command unit
20 vehicle-mounted apparatus
21 short distance communication unit
22 display operation unit
23 speaker
24 sensor
25 control unit
25a operation reception unit
25b display processing unit
25c voice playback unit
25d vehicle information obtaining unit
30 information distribution server
31 communication I/F 32 storage unit
32a web page
33 control unit
33a provided information transmission unit
40 voice synthesizing server
41 communication I/F
42 storage unit
42a dictionary information
43 control unit
43a character string obtaining unit
43b voice conversion unit
43c voice data transmission unit

The invention claimed is:

1. An information providing system comprising a portable terminal apparatus providing predetermined information to a vehicle-mounted apparatus and comprising the vehicle-mounted apparatus, the portable terminal apparatus comprising:
a provided information obtaining unit that obtains provided information including headline data and main text data from an information distribution server apparatus;
a voice data obtaining unit that transmits the headline data to a voice synthesizing server apparatus, and obtaining voice data obtained by converting the headline data into voice from the voice synthesizing server apparatus; and
a display command unit that, when receiving a predetermined notification indicating that the headline data is selected from the vehicle-mounted apparatus, gives a command to cause the vehicle-mounted apparatus to display the main text data corresponding to the headline data, the vehicle-mounted apparatus comprising:
a display unit that displays the main text data corresponding to the selected headline data given by the portable terminal apparatus when the command from the display command unit is received;
a playback unit that plays the voice data; and
a selection operation notification unit, when receiving a selection operation performed by a user, notifies the portable terminal apparatus that the selection operation has been performed, the selection operation being an operation to select the headline data corresponding to the voice data.

2. The information providing system according to claim 1 further comprising a playback command unit that gives a command to cause the vehicle-mounted apparatus to play the voice data,
wherein the display command unit gives a command to cause the vehicle-mounted apparatus to display a list of the headline data, and gives a command to emphasize and display the headline data corresponding to the voice data played according to the command given by the playback command unit.

3. The information providing system according to claim 1, wherein the vehicle-mounted apparatus further comprises a running state obtaining unit that obtains a running state of a vehicle on which the vehicle-mounted apparatus is provided, and wherein when the running state obtaining unit obtains the state indicating that the vehicle is running, the display command unit withholds the display command of the provided information, and when the running state obtaining unit obtains the state indicating that the vehicle is at a stop, the display command unit gives the display command, that has been withheld, to the vehicle-mounted apparatus.

4. The information providing system according to claim 1, wherein the provided information obtaining unit obtains a web page corresponding to an address registered in advance from the information distribution server apparatus, and extracts the provided information from the web page.

5. A vehicle-mounted apparatus for playing information transmitted from a portable terminal apparatus, the vehicle-mounted apparatus comprising:
a partial display unit that displays headline data which is a portion of provided information transmitted from the portable terminal apparatus and including the headline data and main text data;
a playback unit that plays voice data of the headline data transmitted from the portable terminal apparatus;
a selection operation notification unit, when receiving selection operation performed by a user based on the headline data displayed by the partial display unit, notifies the portable terminal apparatus that the selection operation has been received; and
a display unit, when receiving a display command of main text data corresponding to the voice data from the portable terminal apparatus as the selection operation notification unit notifies that the selection operation has been received, displays the main text data corresponding to the selected headline data.

* * * * *